United States Patent
Miyake et al.

(10) Patent No.: US 12,027,997 B2
(45) Date of Patent: Jul. 2, 2024

(54) INVERTER AND REFRIGERATOR INCLUDING INVERTER

(71) Applicant: SAMSUNG ELECTRONICS CO., LTD., Suwon-si (KR)

(72) Inventors: Hiroyuki Miyake, Yokohama (JP); Kosaku Adachi, Yokohama-shi (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 536 days.

(21) Appl. No.: 17/417,543

(22) PCT Filed: Dec. 24, 2019

(86) PCT No.: PCT/KR2019/018416
§ 371 (c)(1),
(2) Date: Jun. 23, 2021

(87) PCT Pub. No.: WO2020/138927
PCT Pub. Date: Jul. 2, 2020

(65) Prior Publication Data
US 2022/0052627 A1    Feb. 17, 2022

(30) Foreign Application Priority Data

Dec. 26, 2018  (JP) .................................. 2018-242624
Nov. 19, 2019  (JP) .................................. 2019-208465
Dec. 23, 2019  (KR) ........................ 10-2019-0173226

(51) Int. Cl.
*H02M 7/538*       (2007.01)
*F25B 49/02*       (2006.01)
*H02M 7/5387*      (2007.01)

(52) U.S. Cl.
CPC ....... *H02M 7/53873* (2013.01); *F25B 49/025* (2013.01); *F25B 2600/021* (2013.01)

(58) Field of Classification Search
CPC .............. H02M 7/53873; F25B 49/025; F25B 2600/021
See application file for complete search history.

(56) References Cited

U.S. PATENT DOCUMENTS

| 8,963,479 B2 | 2/2015 | Suzuki et al. |
| 2013/0021006 A1 | 1/2013 | Fornage |

(Continued)

FOREIGN PATENT DOCUMENTS

| EP | 2 552 008 A1 | 1/2013 |
| JP | 2008-109768 A | 5/2008 |

(Continued)

OTHER PUBLICATIONS

European Search Report dated Dec. 12, 2021 in Application No. EP 19 90 6361.

(Continued)

*Primary Examiner* — Rafael O De Leon Domenech
(74) *Attorney, Agent, or Firm* — STAAS & HALSEY LLP (57) ABSTRACT

Provided is an inverter for reducing electric power consumption and noise. The inverter comprises: a driving unit including three switching elements included in an upper arm and connected in a three-phase bridge configuration and three switching elements included in a lower arm and connected in a three-phase bridge configuration, and converting input direct current power into three-phase alternating current power and then outputting the alternating current power to a three-phase load; and at least one processor for maintaining one of the three switching elements, which are included in the upper arm, in an on-state in a first period, maintaining one of the three switching elements, which are included in the lower arm, in an on-state in a second period, and driving the driving unit in a two-phase modulation method by alternately repeating the first period and the (Continued)

second period, wherein the at least one processor turns on all of the three switching elements at a crest of a carrier wave in the first period, and the at least one processor turns off all of the three switching elements at a crest of a carrier wave in the second period.

19 Claims, 11 Drawing Sheets

(56) References Cited

U.S. PATENT DOCUMENTS

| | | | | |
|---|---|---|---|---|
| 2014/0338379 | A1* | 11/2014 | Hatakeyama | F25B 31/02 62/126 |
| 2015/0096320 | A1* | 4/2015 | Kamiya | F25B 49/025 62/160 |
| 2016/0036360 | A1* | 2/2016 | Maekawa | H02M 7/53873 68/12.15 |
| 2016/0061506 | A1* | 3/2016 | Song | F25B 39/02 62/216 |
| 2017/0272006 | A1* | 9/2017 | Uemura | F25B 49/022 |
| 2018/0245831 | A1* | 8/2018 | Uemura | F25B 40/00 |
| 2019/0097559 | A1* | 3/2019 | Li | H02M 7/53871 |

FOREIGN PATENT DOCUMENTS

| | | |
|---|---|---|
| JP | 2008-206293 A | 9/2008 |
| JP | 2012-130116 A | 7/2012 |
| JP | 5574182 B2 | 8/2014 |
| JP | 2018-64322 A | 4/2018 |
| KR | 10-1998-059802 A | 10/1998 |
| WO | WO 2015/125540 A1 | 8/2015 |

OTHER PUBLICATIONS

European Search Report dated Feb. 3, 2023, in Application No. 19 906 361.1.
International Search Report dated Apr. 29, 2020, in corresponding International Patent Application No. PCT/KR2019/018416.

* cited by examiner

INVERTER AND REFRIGERATOR INCLUDING INVERTER

CROSS-REFERENCE TO RELATED APPLICATIONS

This application is a U.S. National Stage Application which claims the benefit under 35 U.S.C. § 371 of International Patent Application No. PCT/KR2019/018416 filed on Dec. 24, 2019, which claims foreign priority benefit under 35 U.S.C. § 119 of Korean Patent Application 10-2019-0173226 filed on Dec. 23, 2019, and Japanese Patent Application 2019-208465 filed on Nov. 19, 2019, and Japanese Patent Application No. 2018-242624 filed on Dec. 26, 2018, the contents of which are incorporated herein by reference in their entireties.

TECHNICAL FIELD

The present disclosure relates to an inverter and a refrigerator including the inverter.

BACKGROUND ART

Inverters are already used in a wide range of fields, but the scope of application is further expanded in vehicle fields, such as electric vehicles (EV), household appliances, such as refrigerators and air conditioners, renewable energy fields, and distributed generation system.

Related to this, related art documents include Japanese Patent Laid-Open No. 2013-192301, Japanese Patent Laid-Open No. 2018-42429, and Japanese Patent No. 4643404.

As in the above patent documents, various inverters are known. In the two-phase modulation control, it is possible to reduce switching loss and power consumption by setting the number of switching to ⅔ of the three-phase modulation.

DISCLOSURE

Technical Problem

In the conventional two-phase modulation, while the switching loss is reduced, a carrier frequency fundamental component of a current harmonic increases, and a sideband component spreads with respect to the carrier frequency (including the harmonic component), which leads to an increase in noise. Therefore, as for a device requiring the quietness, such as a refrigerator, it is not possible to easily change from the three-phase modulation to the two-phase modulation. In the case of using the conventional two-phase modulation for the purpose of reducing switching loss, it is required to reset the carrier frequency to ensure quietness, but depending on the resonance characteristics of the motor, it is required to set carrier frequency to a higher frequency than the carrier frequency set in the three-phase modulation. In that case, the power saving effect decreases. In addition, a technique of suppressing the increase in harmonics of the sawtooth wave in the related art document has a difficulty in that the current harmonics and noise performance are inferior to the triangular wave due to the magnitude of the current ripple and the characteristics of the sawtooth wave modulation itself.

The present disclosure is directed to providing an inverter capable of reducing a carrier frequency harmonic component of a line voltage in two-phase modulation to a level equivalent to that of three-phase modulation, and capable of improving power saving and quietness.

Technical Solution

One aspect of the present disclosure provides an inverter including a driver including three switching elements included in an upper arm and connected in a three-phase bridge configuration and three switching elements included in a lower arm and connected in a three-phase bridge configuration, the inverter configured to convert input direct current (DC) power into three-phase alternating current (AC) power and configured to output the AC power to a three-phase load, and at least one processor configured to maintain one of the three switching elements, which are included in the upper arm, in an on-state in a first period, configured to maintain one of the three switching elements, which are included in the lower arm, in an on-state in a second period, and configured to control the driver in a two-phase modulation method by alternately repeating the first period and the second period. The at least one processor turns on all of the three switching elements at a crest of a carrier wave in the first period, and the at least one processor turns off all of the three switching elements at a crest of a carrier wave in the second period.

Another aspect of the present disclosure provides an inverter including a driver including three switching elements included in an upper arm and connected in a three-phase bridge configuration and three switching elements included in a lower arm and connected in a three-phase bridge configuration, and configured to convert input direct current (DC) power into three-phase alternating current (AC) power, and at least one processor configured to maintain one of the three switching elements, which are included in the upper arm, in an on-state in a first period, configured to maintain one of the three switching elements, which are included in the lower arm, in an on-state in a second period, and configured to control the driver in a two-phase modulation method by alternately repeating the first period and the second period. The at least one processor turns on all of the three switching elements at a trough of a carrier wave in the first period, and the at least one processor turns off all of the three switching elements at a trough of a carrier wave in the second period.

Another aspect of the present disclosure provides an inverter including a driver including three switching elements included in an upper arm and connected in a three-phase bridge configuration and three switching elements included in a lower arm and connected in a three-phase bridge configuration, and configured to convert input direct current (DC) power into three-phase alternating current (AC) power, and at least one processor configured to maintain one of the three switching elements, which are included in the upper arm, in an on-state in a first period, configured to maintain one of the three switching elements, which are included in the lower arm, in an on-state in a second period, and configured to control the driver in a two-phase modulation method by alternately repeating the first period and the second period. In the first period and the second period, the at least one processor applies a line voltage of "0" to a three-phase load at a crest of the carrier wave.

Advantageous Effects

It is possible to provide an inverter configured to improve power savings and quietness.

MODES OF THE INVENTION

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings. The sizes of elements shown in the drawings are not necessarily expressed to scale.

Overview

Figure 1:
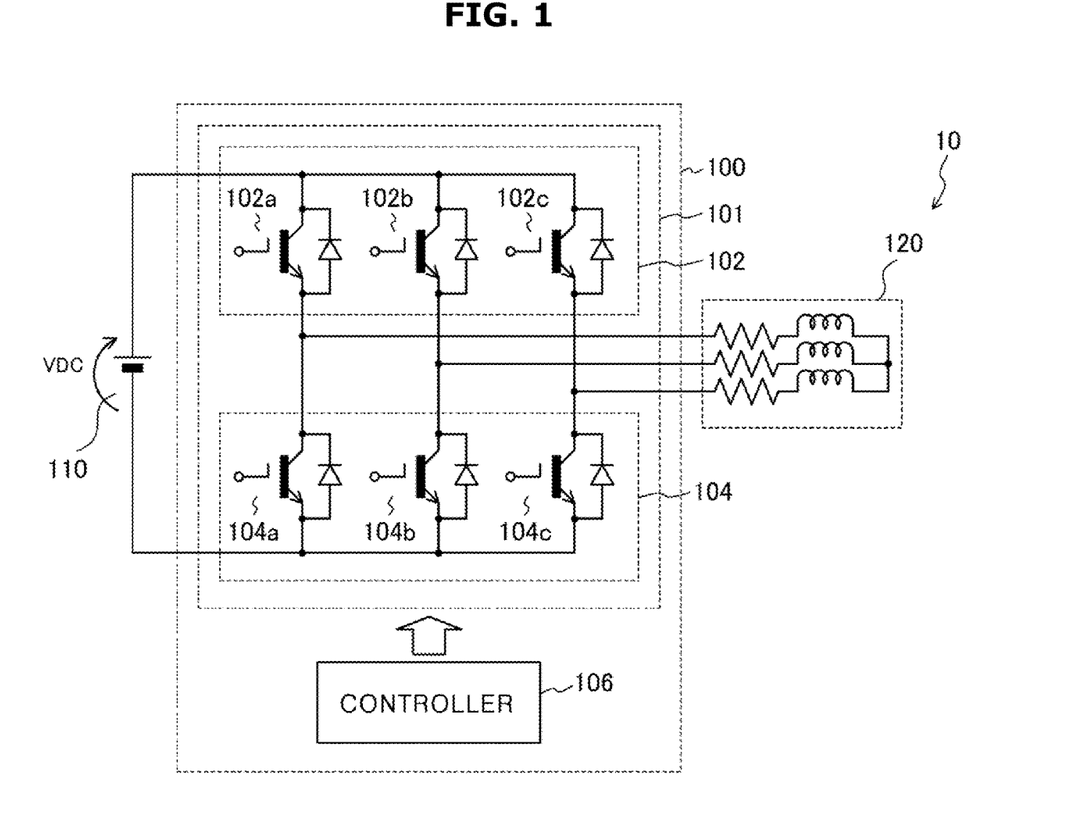
FIG. 1 is a block diagram of an electronic apparatus according to one embodiment of the present disclosure.

FIG. 1 is a block diagram of an electronic apparatus 10 according to one embodiment. The electronic apparatus 10 includes an inverter 100, a direct current (DC) power supply 110 and a load 120. The electronic apparatus 10 is a device including a motor, such as a washing machine, an air conditioner, and a refrigerator. In this case, the load 120 is a motor, but is not limited thereto. Therefore, the load 120 may be any suitable load. For example, the refrigerator may include a refrigerant circuit configured to circulate a refrigerant, and a compressor configured to compress the refrigerant in a gaseous state in the refrigerant circuit. In addition, the compressor may include a motor. In addition, the air conditioner may also include a refrigerant circuit, the refrigerant circuit of the air conditioner may include a compressor, and the compressor may include a motor.

The inverter 100 receives DC power from the DC power supply 110, converts the DC power into three-phase alternating current (AC) power and outputs the three-phase AC power to the load 120. The DC power supply 110 may rectify an AC from an AC power source to generate a DC. For example, the DC power supply 110 may rectify and smooth 100 volts AC obtained from a household power outlet and then supply DC power to the inverter 100.

The inverter 100 includes a driver 101 and a controller 106. The driver 101 includes an upper arm 102 and a lower arm 104. The upper arm 102 includes three switching elements 102a to 102c. The lower arm 104 includes three switching elements 104a to 104c. The switching elements 102a to 102c and 104a to 104c are connected to each other in a three-phase bridge configuration, and the switching elements 102a to 102c and 104a to 104c convert DC power, which is input from the DC power supply 110, into three-phase AC power, and outputs the three-phase AC power to the load 120. The switching elements 102a to 102c and 104a to 104c may typically include an Insulated Gate Bipolar Transistor (IGBT) or a Field Effect Transistor (Metal-Oxide-Silicon Field-Effect Transistor, MOSFET), but are limited thereto. Alternatively, the switching elements 102a to 102c and 104a to 104c may include any suitable semiconductor switching device. In the switching element 102a to 102c and 104a to 104c, a flywheel diode is connected in anti-parallel.

The controller 106 controls the power output from the driver 101 to the load 120 by applying an appropriate control voltage to the gate that is a control terminal of the switching elements 102a to 102c and 104a to 104c. The controller 106 controls a switching timing of the switching elements 102a to 102c and 104a to 104c according to the power consumed by the load 120.

Main Circuit Control

Figure 2:
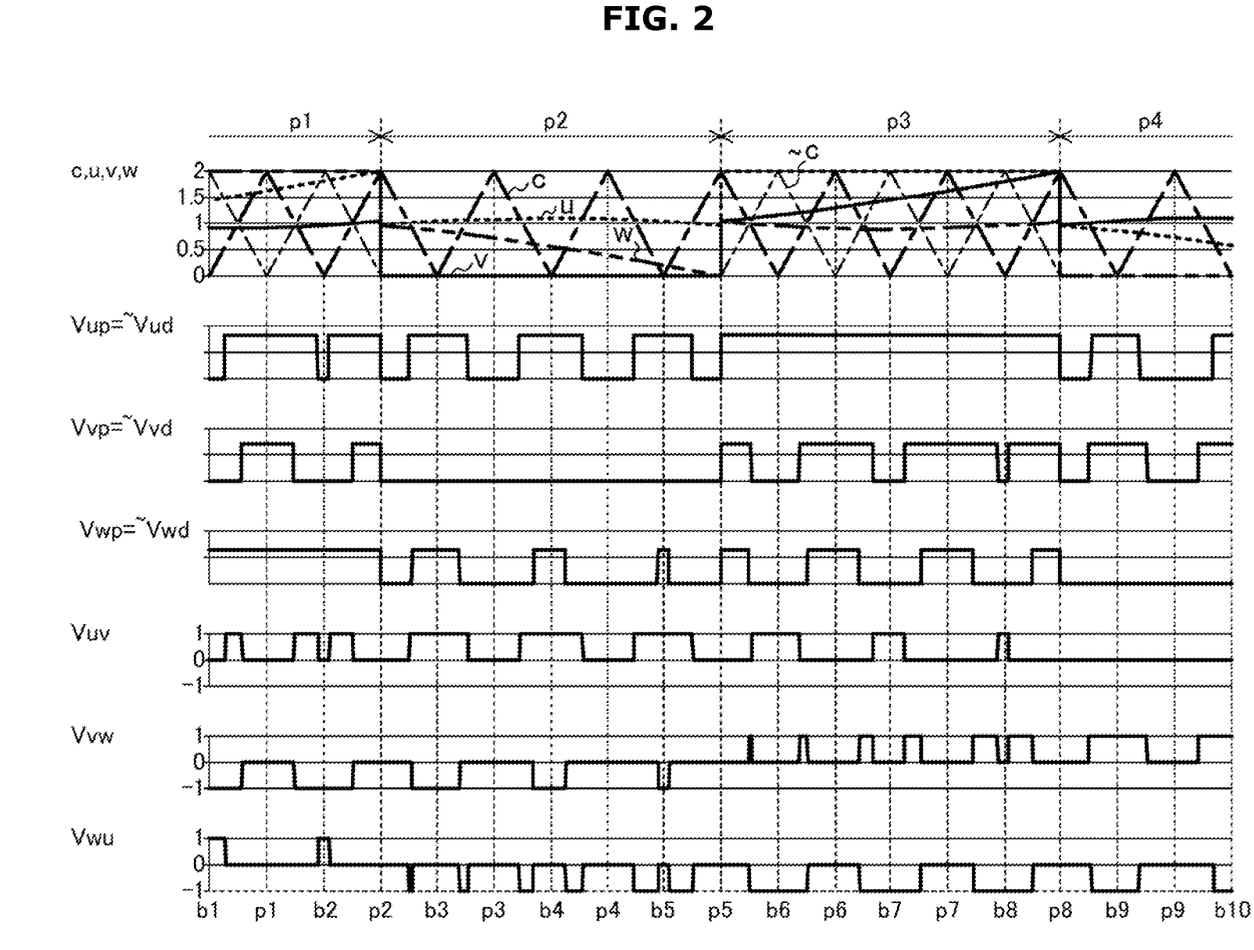
FIG. 2 is a waveform diagram illustrating a carrier wave and a modulated wave used by a controller, and a control signal and a line voltage applied to a driver according to one embodiment of the present disclosure.

FIG. 2 is a waveform diagram illustrating a carrier wave C and modulated waves U, V, and W used by the controller 106, and control signals Vup, Vud, Vvp, Vvd, Vwp, and Vwd and line voltages Vuv, Vvw, and Vwu applied to the driver 101 according to one embodiment of the present disclosure. The control signals Vup, Vud, Vvp, Vvd, Vwp, and Vwd are control signals applied to the control terminals of the switching elements 102a, 104a, 102b, 104b, 102c, and 104c, respectively.

In two switching elements of the upper arm 102 and lower arm 104 on the same phase, one thereof is "on" and the other is "off". Therefore, for example, a control signal Vup and a negation of the control signal Vud (indicated by "α (tilde)" in FIG. 2) are the same. This relationship is also applied to the control signals Vvp, Vvd, Vwp, and Vwd.

The modulated waves U, V, and W may be modulated by the carrier wave C. The modulated waves U, V, and W may be derived from a three-phase AC voltage to be applied to the load 120.

The controller 106 performs pulse width modulation on the modulated wave U, V and W by using the carrier wave C, so as to allow the modulated waves U, V, and W, which is a three-phase AC voltage, to be applied to the load 120.

The controller 106 uses a triangular wave as the carrier wave C. The controller 106 generates a control signal applied to the control terminals of the switching elements 102a to 102c and 104a to 104c based on the comparison of the carrier wave C and the modulated waves U, V, and W. In other words, the control signal is a signal obtained as a result of performing the pulse width modulation on the modulated waves U, V, and W using the carrier wave C.

As described below, the comparison logic between the carrier wave C and the modulated waves U, V, and W is inverted in a first period p1, and p3 and a second period p2 and p4. In other words, the controller 106 modulates the modulated waves U, V, and W using a normal carrier wave C during the first period p1 and p3, and modulates the modulated waves U, V, and W using an inverted carrier wave ~C during the second period p2 and p4.

Therefore, if it is assumed that the first period p1 and p3 is active-low, the second period p2 and p4 is active-high. The controller 106 alternately repeats the first period (e.g., periods p1 and p3) and the second period (e.g., periods p2 and p4) to operate the driver 101 in the two-phase modulation method. The first period p1 and p3 and the second period p2 and p4 correspond to, for example, 60 degrees when a cycle of the modulated waves U, V, and W is set based on a phase.

First Period (Active Low, +VDC/2 Shift)

In the periods p1 and p3 (collectively referred to as the first period), the controller 106 shifts the modulated wave by +VDC/2, and in response to the modulated wave U, V, and W being equal to or greater than ~carrier wave ~C (modulated wave U, V, and W≥~carrier wave ~C), the controller 106 turns on the switching elements 102a, 102b, and 102c of the upper arm 102, and in response to the modulated wave U, V, and W being less than ~carrier wave ~C (modulated wave U, V, and W<~carrier wave ~C), the controller 106 turns off the switching elements 102a, 102b, and 102c of the upper arm 102. "~carrier wave" represents a signal in which a phase of a carrier wave is shifted by 180 degrees (half cycle). Because the carrier wave is a triangular wave, "~carrier wave" has a waveform in which a crest and a trough of the carrier are inverted. That is, a position of the crest and trough of the carrier wave corresponds to a position of a trough and crest of the carrier wave.

In the first period p1 and p3, the controller 106 allows the upper arm of one of the three phases to be a conductive state, and allows the lower arm of one of the three phases to be a non-conductive state. For example, in the period p3, which is the first period p1 and p3, the control signal Vup turns on the switching element 102a, and the control signal Vud turns off the switching element 104a. Unlike the three-phase modulation, which turns on/off all of the switching elements 102a, 102b, and 102c of the upper arm 102 and the switching elements 104a, 104b, and 104c of the lower arm 104, the controller 106 maintains any one of the switching elements 102a, 102b, and 102c of the upper arm 102 in an on-state and maintains any one of the lower arm 104 in an off-state according to the two-phase modulation. Accordingly, power loss due to switching of the switching elements 102a, 102b, 102c, 104a, 104b, and 104c is reduced.

Second Period (Active High, −VDC/2 Shift)

In the periods p2 and p4 (collectively referred to as the second period), the controller 106 shifts the modulated wave by −VDC/2, and in response to the modulated wave U, V, and W being equal to or greater than carrier wave ~C (modulated wave U, V, and W≥carrier wave C), the controller 106 turns on the switching elements 102a, 102b, and 102c of the upper arm 102, and in response to the modulated wave U, V, and W being less than carrier wave C (modulated wave U, V, and W<carrier wave C), the controller 106 turns off the switching elements 102a, 102b, and 102c of the upper arm 102.

In the second period, the controller 106 allows the upper arm of one of the three phases to be the non-conductive state, and allows the lower arm of one of the three phases to be the conductive state. For example, in the period p2, which is the second period p2 and p4, the control signal Vvp turns off the switching element 102a, and the control signal Vvd turns on the switching element 104a. Unlike the three-phase modulation, which turns on/off all of the switching elements 102a, 102b, and 102c of the upper arm 102 and the switching elements 104a, 104b, and 104c of the lower arm 104, the controller 106 maintains any one of the switching elements 102a, 102b, and 102c of the upper arm 102 in the off-state and maintains any one of the lower arm 104 in the on-state according to the two-phase modulation. Accordingly, power loss due to switching of the switching elements 102a, 102b, 102c, 104a, 104b, and 104c is reduced.

In FIG. 2, in the first period (e.g., the period p3), the controller 106 generates zero vector (1, 1, 1) in which all of the three elements (e.g., the switching elements 102a to 102c) are turned on, at a crest of the carrier wave C (e.g., a time p6 and p7). Accordingly, a line voltage is not applied to the three phases of the load 120 at the crest of the carrier wave C (e.g., the time p6 and p7).

In the second period (e.g., the period p2), the controller 106 generates zero vector (0, 0, 0) in which all of the three elements (e.g., the switching elements 102a to 102c) are turned off, at a crest of the carrier wave C (e.g., a time p3 and p4). Accordingly, a line voltage is not applied to the three phases of the load 120 at the crest of the carrier wave C (e.g., the time p3 and p4).

Alternatively, the logic of the case of FIG. 2 may be inverted. That is, in the first period (e.g., the period p3), the controller 106 generates zero vector (1, 1, 1) in which all of the three elements (e.g., the switching elements 102a to 102c) are turned on, at a trough of the carrier wave C (e.g., a time b6, b7, and b8). Accordingly, a line voltage is not applied to the three phases of the load 120 at the trough of the carrier wave C (e.g., the time b6, b7, and b8).

In the second period (e.g., the period p2), the controller 106 generates zero vector (0, 0, 0) in which all of the three elements (e.g., the switching elements 102a to 102c) are turned off, at a trough of the carrier wave C (e.g., a time b3, b4, and b5). Accordingly, a line voltage is not applied to the three phases of the load 120 at the trough of the carrier wave C (e.g., the time b3, b4, and b5).

According to the above-described configuration, a position, in which the line voltage is generated, becomes the same between the first period and the second period. Particularly, a period, in which the line voltage Vuv, Vvw, and Vwu is generated, occurs with respect to the times p1 to p9 (or b1 to b10), but as the phase progresses, the period is slightly different, however, which is approximately symmetrical. In addition, an interval between the times p1 to p9 (or an interval between the times b1 to b9) is equal. As a result, the carrier frequency fundamental component of the phase current harmonic does not diffuse. Therefore, the effect of reducing the noise of the inverter 100 is exhibited. This is in contrast to the fact that in the related art, the carrier frequency fundamental component of the phase current harmonic diffuses and increases, and noise increases due to the shift of the position of the line voltage generation between the first period and the second period.

According to one embodiment, the control signals of the first period Vup, Vud, Vvp, Vvd, Vwp, and Vwd and the control signals of the second period Vup, Vud, Vvp, Vvd, Vwp, and Vwd are generated by a single timer. Accordingly, it possible to simplify the circuit configuration.

According to one embodiment, during the first period and the second period, a reference position in which the line voltage is generated is a crest of the carrier wave, as shown in FIG. 2 (or during the first period and the second period, a reference position in which the line voltage is generated is a trough of the carrier wave, which is inverted from the case of FIG. 2). The reference position in which the line voltage is generated is a constant cycle. Further, in response to switching between the first period and the second period, the on/off states of the three-phase switching elements are simultaneously inverted.

According to one embodiment, the controller 106 drives the driver 101 based on the carrier wave C in which a frequency changes within a predetermined range. For example, for each cycle of the carrier wave C, the controller 106 changes the frequency such as 8.0 kHz, 8.2 kHz, 7.8 kHz, 8.0 kHz, 8.2 kHz, 8.0 kHz. By this intentionally applied jitter, the sideband of the current harmonic may be adjusted, and the peak of the fundamental component may be reduced and further dispersed. In response to applying a jitter, the reference position at which line voltage is generated is shifted, but because an amount of jitter is mostly absent, the reference position at which the line voltage is generated is approximately constant. Because the spectrum of noise is spread, the effect of reducing noise is exhibited. In the conventional two-phase modulation method, because the sideband component of the carrier frequency (including harmonics) is spread, when the carrier frequency is changed (spread), the carrier component is spread over a wider frequency range, which is disadvantageous in terms of noise. Therefore, the configuration according to the present disclosure is excellent in terms of noise, in comparison with the related art.

Inversion of Comparison Logic

Figure 3:
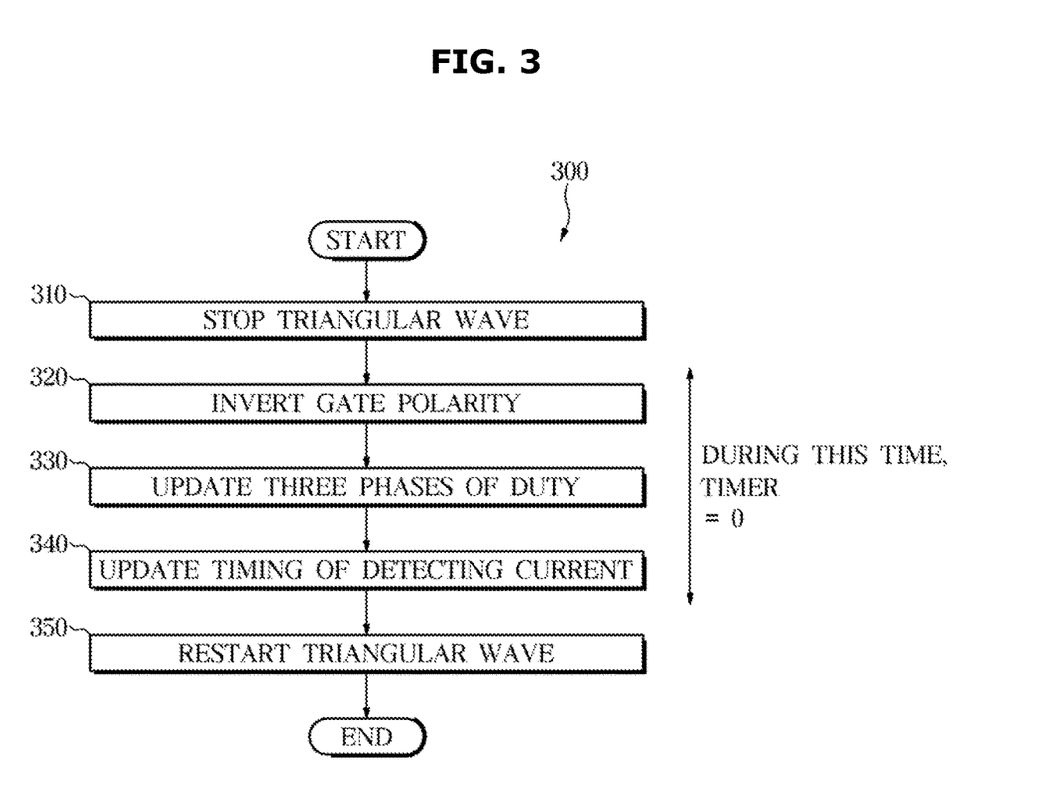
FIG. 3 is a flowchart of an algorithm of a timer of the controller to be used to generate a control signal according to one embodiment of the present disclosure.

FIG. 3 is a flowchart of an algorithm 300 of a timer of the controller 106 to be used to generate the control signals Vup, Vud, Vvp, Vvd, Vwp, and Vwd according to one embodiment of the present disclosure. As described above, in order to generate the control signals Vup, Vud, Vvp, Vvd, Vwp, and Vwd of FIG. 2, it is required to stop and/or restart a motor pulse width modulation (PWM) generator using a timer for the inversion of the comparison logic every 60 degrees of the phase of the carrier wave C. In step 310, the timer of the controller 106 stops generation of the triangular wave. In step 320, the controller 106 inverts the gate polarity in order to invert the comparison logic. In step 330, the controller 106 updates three phases of duty. In step 340, the controller 106 updates a timing of detecting a current. In step 350, the timer of the controller 106 restarts generation of the triangular wave.

Figure 4:
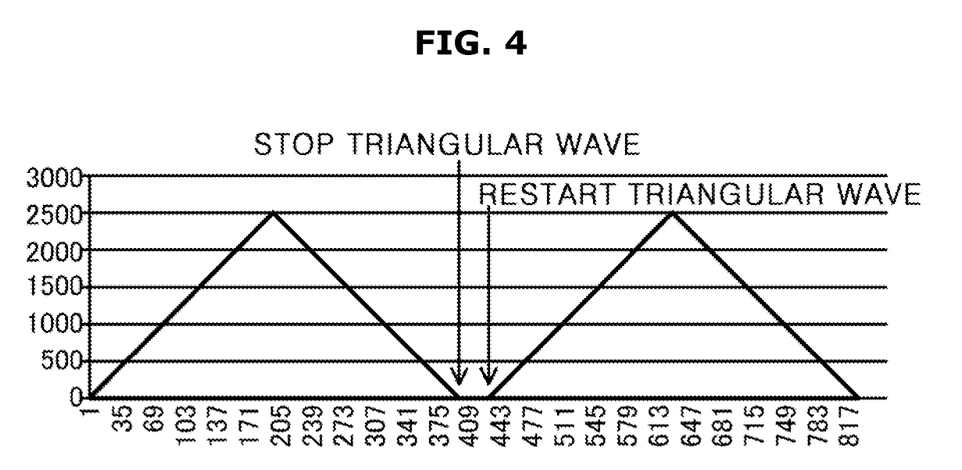
FIG. 4 is a view illustrating a carrier wave generated by the algorithm according to one embodiment of the present disclosure.

FIG. 4 is a view illustrating a carrier wave generated by the algorithm 300 according to one embodiment of the present disclosure. The timer adds an output value from a time 1 and subtracts an output value from a time 205. At times 409 to 443 corresponding to steps 320 to 340 in FIG. 3, the value output by the timer is zero. Therefore, a total time is exceeded due to stopping and restarting of the timer (a right end of a plot in FIG. 4). If there is no difficulty with this shift, it is possible to use the algorithm of FIG. 3.

Figure 5:
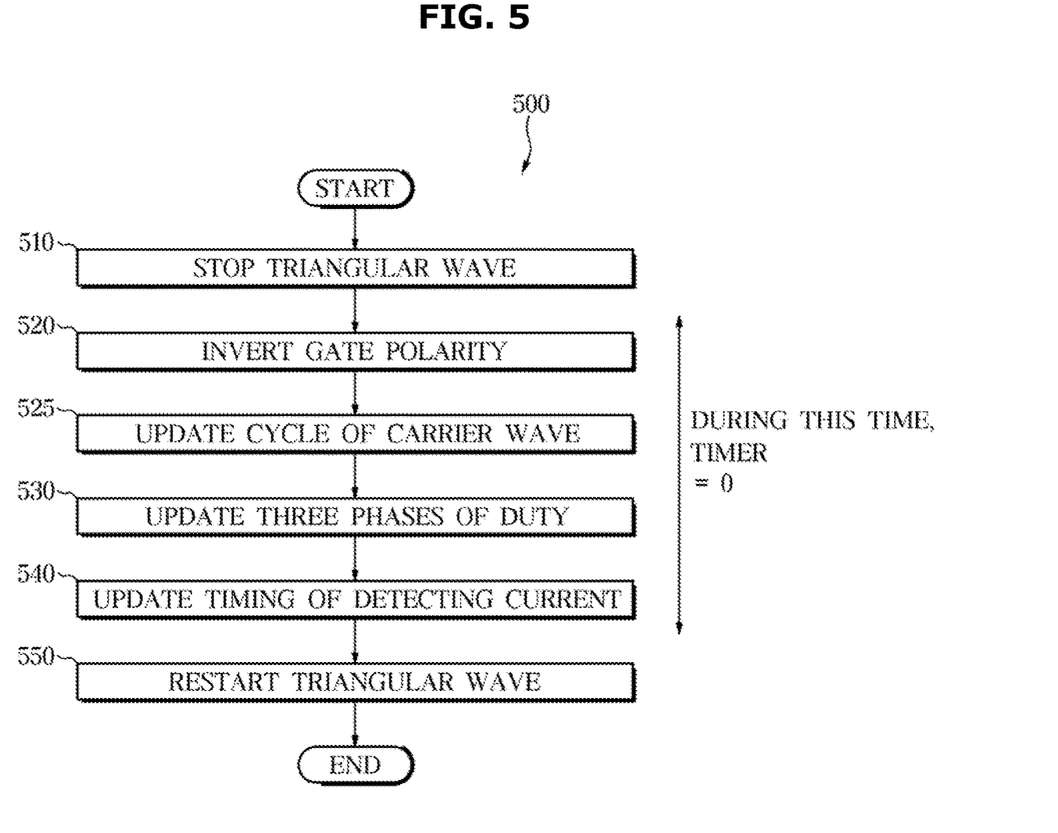
FIG. 5 is a flowchart of an algorithm of the timer of the controller to be used to generate a control signal according to one embodiment of the present disclosure.

FIG. 5 is a flowchart of an algorithm 500 of the timer of the controller 106 to be used to generate a control signal Vup, Vud, Vvp, Vvd, Vwp, and Vwd according to one embodiment of the present disclosure. An operation at steps 510, 520, 530, 540, and 550 are the same as those at steps 310, 320, 330, 340, and 350, respectively. The algorithm 500 compensates for the shift of the period in which the timer is zero by updating the period of the carrier C in step 525. Accordingly, it is possible to implement a time compensator configured to compensator for a stopped time that occurs stopping the carrier wave, inverting the gate logic, and restarting the carrier wave in the case of switching the pulse generation in the first period and the second period. The time compensator may typically be implemented by a combination of software that executes algorithm 500 and hardware that executes the software.

Figure 6:
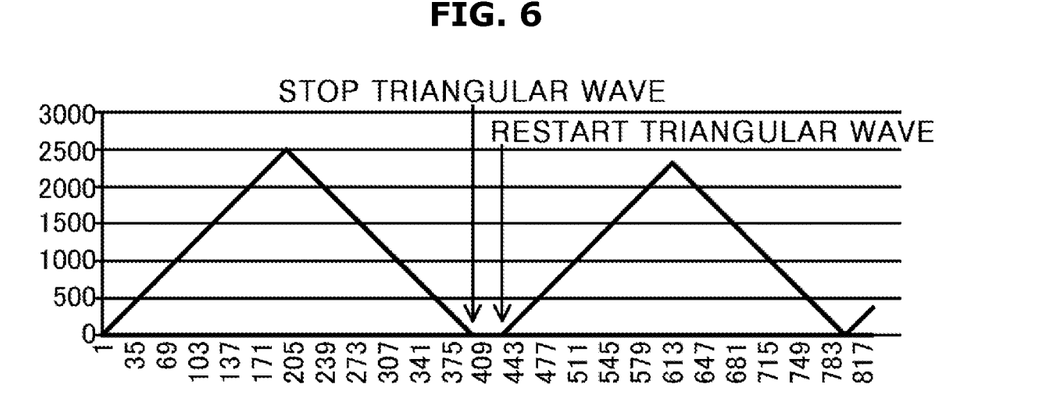
FIG. 6 is a view illustrating a carrier wave generated by the algorithm according to one embodiment of the present disclosure.

FIG. 6 is a view illustrating a carrier wave generated by the algorithm 500 according to one embodiment of the present disclosure. At times 409 to 443, the timer is zero, but by changing the cycle of the carrier wave C at step 525, it is possible to prevent the cycle of the carrier wave C from exceeding the entire time. That is, in order to compensate for the carrier cycle after stopping, to fit the entire time, it is possible to lower a height of a crest (e.g., a height of a crest at a time 613). Accordingly, according to the algorithm 500, even if there is a period in which the value of the triangular wave becomes zero for the inversion of the comparison logic, the cycle as a whole is not affected.

According to the algorithm 300, a microprocessor of the controller 106 needs to stop/restart the carrier wave C, which is the triangular wave, in response to that the timer is switched or the output polarity is changed. On the other hand, according to the algorithm 500, a microprocessor of the controller 106 may compensate for the stopped time and obtain synchronization with real time. That is, the controller 106 secures the stability of the system by compensating for the difference from real time when the setting is changed. This configuration has the effect in which it is possible to mount even an inexpensive microprocessor including only one timer.

Modification of Gate Change Timing

Figure 7:
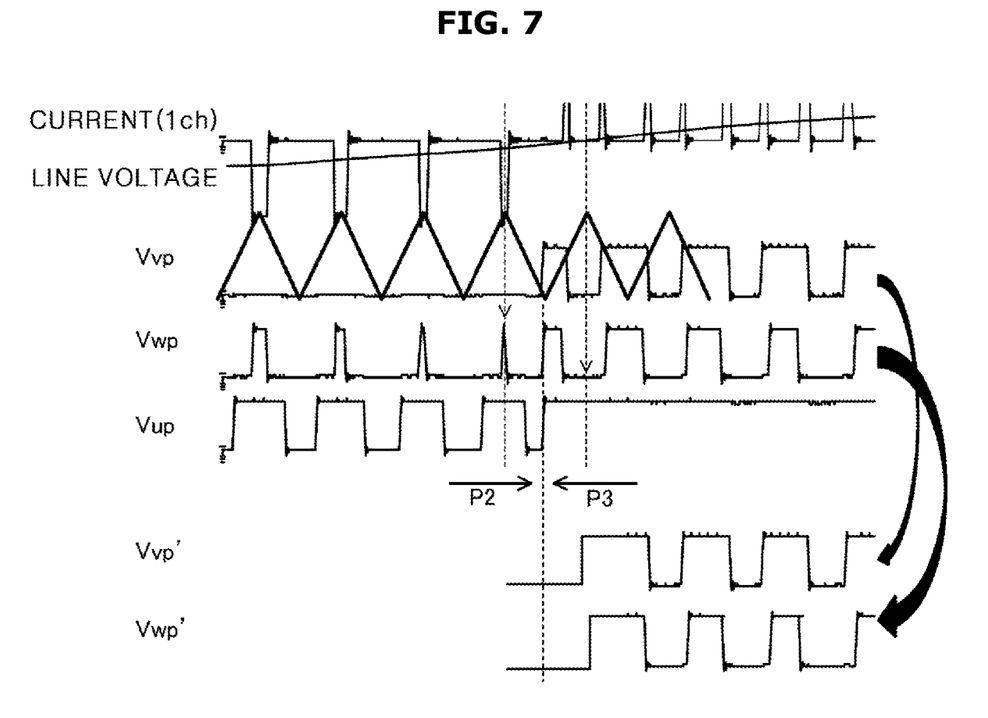
FIG. 7 is a view illustrating a modification of a timing of changing a gate in a boundary between a first period and a second period according to one embodiment of the present disclosure.

FIG. 7 is a view illustrating a modification of a timing of changing a gate in a boundary between the first period and the second period of the control signal according to one embodiment of the present disclosure. At the boundary between the period p2 and the period p3, a V-phase gate voltage Vvp and a W-phase gate voltage Vwp are originally transitioned as shown in FIG. 7. According to one embodiment, on one phase in the conductive state (two phases a V-phase Vvp and a W-phase Vwp except a U-phase Vup), the controller 106 generates a control signal to initiate the on/off state of the upper arm and the lower arm, which occurs after switching, at the on/off state of the upper arm and the lower arm that occurs before switching. The controller 106 uses a V-phase gate voltage Vvp' and a W-phase gate voltage Vwp' to allow the on/off state of the upper arm and the lower arm to be the same before and after the transition (that is, immediately before and immediately after switching). As a result, the three phases are not simultaneously inverted at the time of logic inversion, but by shifting the gate change timing, the effect of reducing the fluctuation of the neutral potential and suppressing an increase in leakage current is exhibited.

According to one embodiment, in a case of switching between the first period and the second period, the controller 106 performs switching without stopping the carrier wave that is a triangular wave. Because the logic inversion is changed without stopping the carrier wave by the microprocessor forming the controller 106, it is possible to eliminate the difference from real time upon changing the setting at the boundary between the first period and the second period.

Hardware

Figure 8:
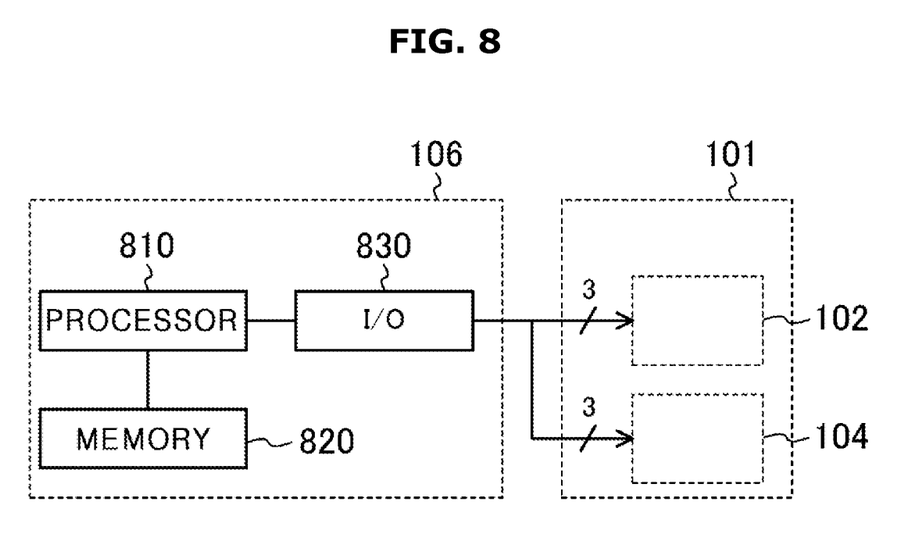
FIG. 8 is a block diagram illustrating a structure of the controller according to one embodiment of the present disclosure.

FIG. 8 is a block diagram illustrating a structure of the controller 106. The controller 106 includes at least one processor 810, a memory 820, and an inputter/outputter 830. The processor 810 generates the control signal Vup, Vud, Vvp, Vvd, Vwp, and Vwd from the carrier wave C and the modulated wave U, V, and W, and outputs the control signal to the switching elements 102a to 102c and 104a to 104c of the driver 101, respectively, as illustrated in FIG. 2. The memory 820 stores instructions and parameters used in the processing executed by the processor 810. The inputter/outputter 830 generates a control signal based on the output of the processor 810 and outputs the control signal to the upper arm 102 and the lower arm 104 of the driver 101. The inputter/outputter 830 may be embedded in the processor 810.

Among the functions of the controller 106, a function of generating a desired control signal by inverting the gate logic without stopping the carrier wave at the boundary between the first period and the second period is appropriately implemented by hardware. As a result, it is possible to obtain an effect that a delay is not generated and an accurate control signal is generated.

Inversion of Carrier Wave and Inversion of Modulated Wave

In the example shown in FIG. 2, the phase of the carrier wave is inverted in the first period and the second period.

Figure 9:
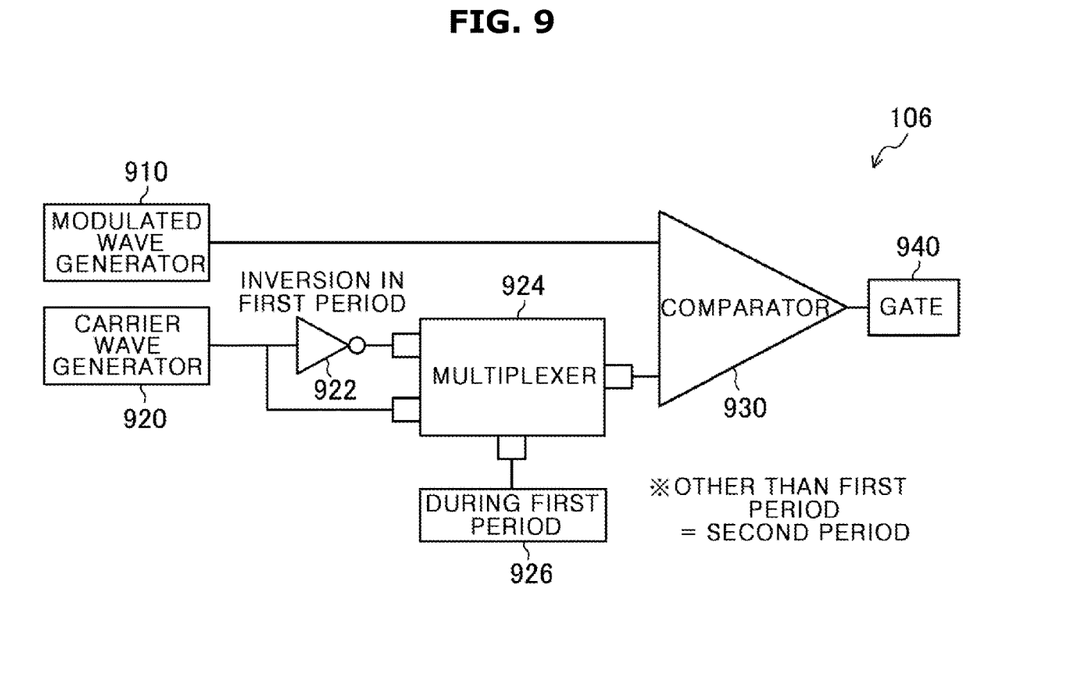
FIG. 9 is a block diagram of the controller configured to perform an inversion of the carrier wave according to one embodiment of the present disclosure.

FIG. 9 is a block diagram of the controller 106 configured to perform an inversion of the carrier wave according to one embodiment of the present disclosure. The controller 106 includes a modulated wave generator 910, a carrier wave generator 920, an inverter 922, a multiplexer 924, a period control 926, a comparator 930, and a gate 940. As an example, in the first period, the period control 926 is set to be high, and the multiplexer 924 outputs an output of the inverter 922 to the comparator 930. In the second period, the period control 926 is set to be low, and the multiplexer 924 outputs an output of the carrier wave generator 920 to the comparator 930. The comparator 930 compares the output of the modulated wave generator 910 with the output of the multiplexer 924 and drives the gate 940. The gate 940 generically represents the control terminals of the switching elements 102a to 102c and 104a to 104c.

Instead of inverting the phase of the carrier wave, it is possible to invert the phase of the modulated wave in the first period and the second period.

Figure 10:
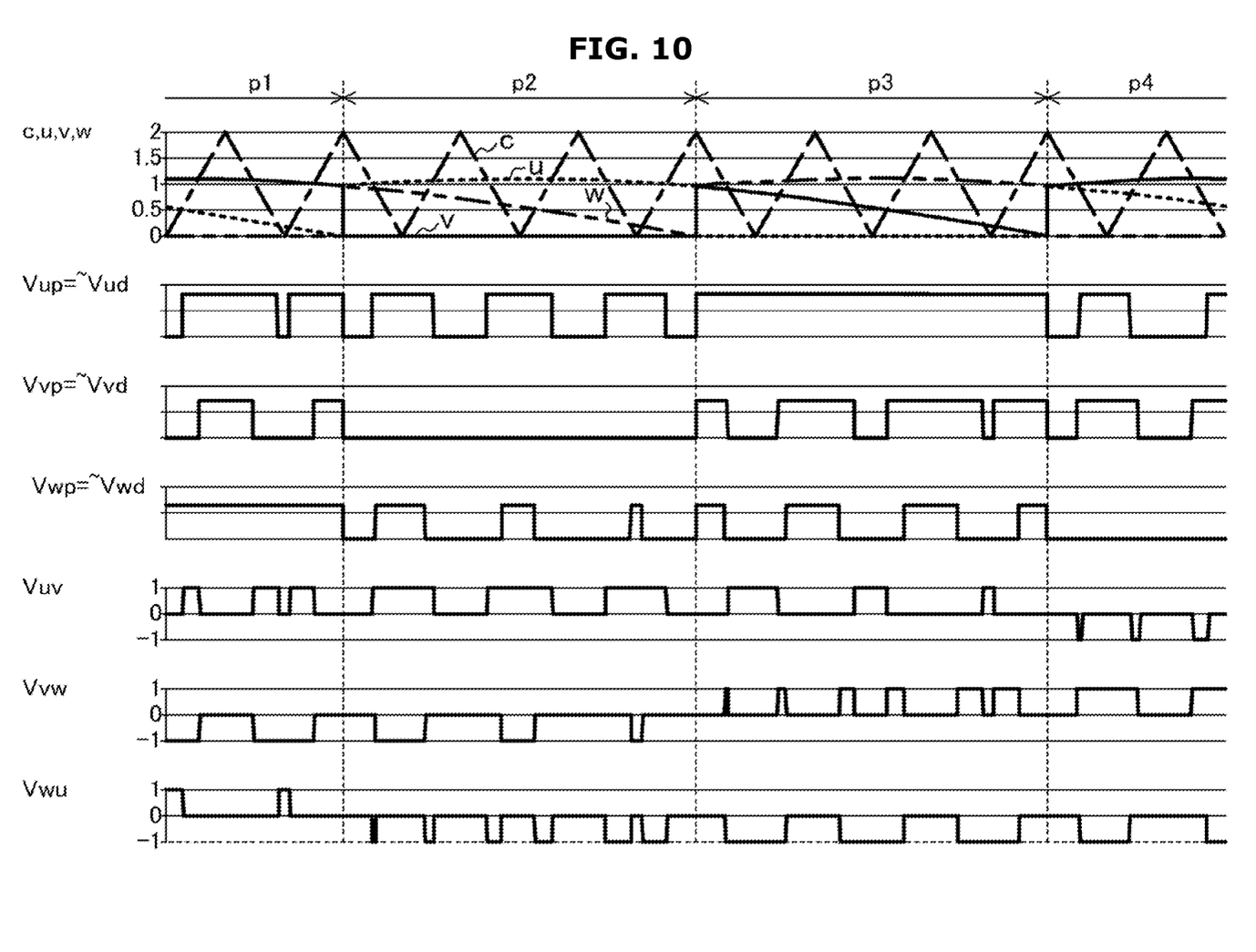
FIG. 10 is a view illustrating an example, in which a phase of a modulated wave in the first period and a phase of a modulated wave in the second period are inverted, according to one embodiment of the present disclosure.

FIG. 10 is a view illustrating an example, in which a phase of a modulated wave of the first period and a phase of a modulated wave of the second period of the control signal are inverted, according to one embodiment of the present disclosure. In FIG. 10, a phase of the carrier wave is the same in the first period and the second period. However, a magnitude relationship of the modulated wave, that is, the sign of the positive and negative, is inverted in the first and second periods.

Figure 11:
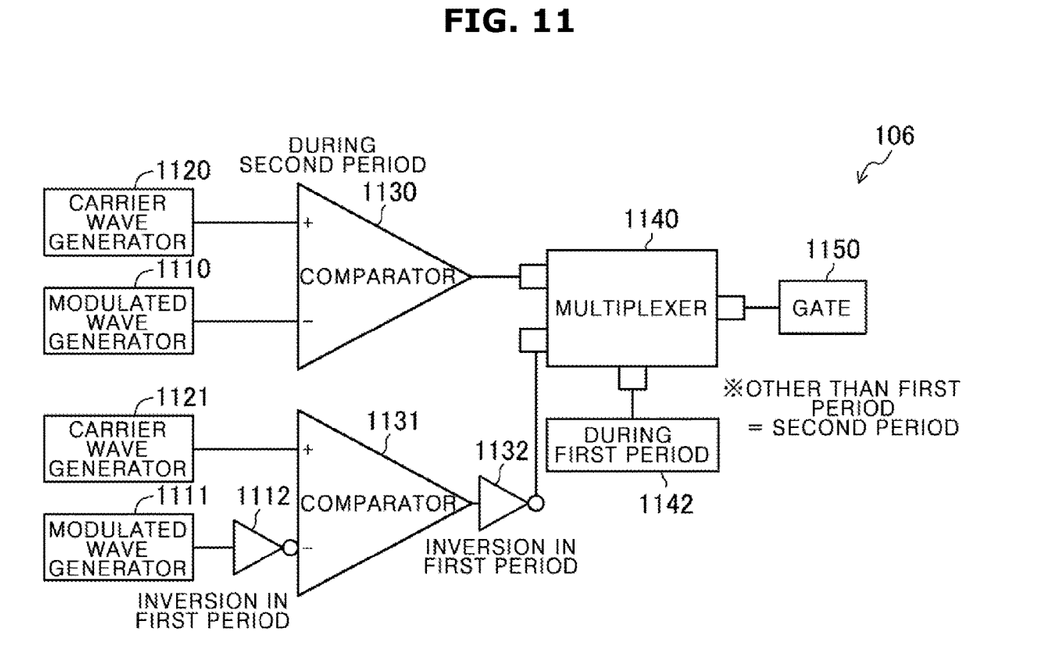
FIG. 11 is a block diagram of the controller configured to perform an inversion of the carrier wave according to one embodiment of the present disclosure.

FIG. 11 is a block diagram of the controller 106 configured to perform an inversion of the modulated wave shown in FIG. 10. The controller 106 includes modulated wave generators 1110 and 1111, carrier wave generators 1120 and 1121, inverters 1112 and 1132, comparators 1130 and 1131, a multiplexer 1140, a period control 1142, and a gate 1150. For example, in the first period, the period control 1142 is set to be high, and the multiplexer 1140 outputs an output of the inverter 1132 to the gate 1150. In the second period, the period control 1142 is set to be low, and the multiplexer 1140 outputs an output of the comparator 1130 to the gate 1150. The comparator 1130 compares the output of the modulated wave generator 1110 with the output of the carrier wave generator 1120. The comparator 1131 compares the output of the modulated wave generator 1111 inverted by the inverter 1112 with the output of the carrier wave generator 1121. The gate 1150 generically represents the control terminals of the switching elements 102a to 102c and 104a to 104c.

Each of the various functions in the present disclosure may be implemented by a single element or by a plurality of elements. Further, a plurality of functions may be implemented by a single element. Each function may be implemented by hardware, software, or a combination of hardware and software. The flowchart in the present disclosure includes a plurality of blocks. The processing of these blocks may be performed serially or parallel. Further, the execution order of a plurality of blocks may be performed alternately.

An apparatus and method according to the present disclosure uses a processor. When this processor executes a computer program, the apparatus or method according to the present disclosure may be implemented. A processor is typically hardware that makes up a part of a computer, and operates according to a computer program. The type of processor is not limited as long as its function can be implemented by executing a computer program. The processor is implemented by one or more electronic circuits. The processor includes a semiconductor integrated circuits (IC), a large-scale integration (LSI) circuit, a system large-scale integration (LSI), a field programmable gate array (FPGA), a very large-scale integration (VLSI) circuit, and an ultra-sized integration (VLSI) circuit. A plurality of electronic circuits may be integrated on one chip or may be provided on a plurality of chips. A plurality of chips may be integrated in one device or may be provided in a plurality of devices. The computer program may be stored in a non-transitory storage medium readable by a computer. Such media include read-only memory (ROM), random access memory (RAM), optical disk, hard disk drive, and the like. The computer program may be stored in advance in a storage medium or may be downloaded to the storage medium through a communication network including the Internet or the like.

Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium. For example, "non-transitory storage medium" may include a buffer in which data is temporarily stored.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:
a compressor comprising a motor; and
an inverter comprising:
  a driver comprising three switching elements included in an upper arm and connected in a three-phase bridge configuration and three switching elements included in a lower arm and connected in a three-phase bridge configuration, the inverter configured to convert input direct current (DC) power into three-phase alternating current (AC) power and to output the three-phase AC power to the motor; and
  at least one processor configured to
    maintain, in first period, one of the three switching elements, which are included in the upper arm, in an on-state over an entirety of the first period, and one of the three switching elements, which are included in the lower arm, in an off-state over the entirety of the first period,
    maintain, in a second period, one of the three switching elements, which are included in the lower arm, in an on-state over an entirety of the second period, and one of the three switching elements, which are included in the upper arm, in an off-state over the entirety of the second period,
    turn on all of the three switching elements, which are included in the upper arm, and turn off all of the three switching elements, which are included in the lower arm, at a crest of a carrier wave in the first period,
    turn off all of the three switching elements, which included in the upper arm, and turn on all of the three switching elements, which are included in the lower arm, at a crest of a carrier wave in the second period, and
    control the driver in a two-phase modulation method by alternatively repeating the first period and the second period.

2. The refrigerator of claim 1, wherein
in the first period and the second period, the at least one processor is configured to apply a line voltage of "0" to the motor at the crest of the carrier wave.

3. The refrigerator of claim 1, wherein
in response to switching between the first period and the second period, the at least one processor is configured to simultaneously invert eon-states/off-states of the three switching elements, which are included in the upper arm, and the three switching elements, which are included in the lower arm.

4. The refrigerator of claim 1, wherein
the at least one processor is configured to generate a carrier wave, which is inverted from the carrier wave in the first period, in the second period.

5. The refrigerator of claim 1, wherein
the at least one processor is configured to generate a modulated wave, which is inverted from a modulated wave in the first period, in the second period.

6. The refrigerator of claim 1, wherein
the at least one processor comprises a single timer.

7. The refrigerator of claim 1, wherein
the at least one processor is configured to drive the driver based on a carrier wave in which a frequency varies within a predetermined range.

8. The refrigerator of claim 1, wherein
the at least one processor comprises a time compensator configured to compensate for a stopped time that occurs upon stopping a carrier wave, inverting a gate logic and restarting a carrier wave in response to switching between the first period and the second period.

9. The refrigerator of claim 1, wherein
the at least one processor is configured to switch between the first period and the second period without stopping a carrier wave that is a triangular wave.

10. A refrigerator comprising:
a compressor comprising a motor; and
an inverter comprising:
  a driver comprising three switching elements included in an upper arm and connected in a three-phase bridge configuration and three switching elements included in a lower arm and connected in a three-phase bridge configuration, and configured to convert input direct current (DC) power into three-phase alternating current (AC) power and to output the three-phase AC power to the motor, and
  at least one processor configured to
    maintain, in a first period, one of the three switching elements, which are included in the upper arm, in an on-state over an entirety of the first period, and one of the three switching elements, which are included in the lower arm, in an off-state over an entirety of the first period,
    maintain, in a second period, one of the three switching elements, which are included in the lower arm, in an on-state over an entirety of the second period, and one of the three switching elements, which are included in the upper arm, in an off-state over an entirety of the second period,
    turn on all of the three switching elements, which are included in the upper arm, and turn off all of the three switching elements, which are included in the lower arm, at a trough of a carrier wave in the first period,
    turn off all of the three switching elements, which included in the upper arm, and turn on all of the three switching elements, which are included in the lower arm, at a trough of a carrier wave in the second period, and
    control the driver in a two-phase modulation method by alternatively repeating the first period and the second period.

11. The refrigerator of claim 10, wherein
in the first period and the second period, the at least one processor is configured to apply a line voltage of "0" to the motor at the trough of the carrier wave.

12. The refrigerator of claim 10, wherein
in response to switching between the first period and the second period, the at least one processor is configured to simultaneously invert on-states/off-states of the three switching elements, included in the upper arm, and the three switching elements, included in the lower arm.

13. The refrigerator of claim 10, wherein
the at least one processor is configured to generate a carrier wave, which is inverted from the carrier wave of the first period, in the second period.

14. The refrigerator of claim 10, wherein
the at least one processor is configured to generate a modulated wave, which is inverted from a modulated wave of the first period, in the second period.

15. The refrigerator of claim 10, wherein
the at least one processor is configured to drive the driver based on a carrier wave in which a frequency varies within a predetermined range.

16. A refrigerator comprising:
a compressor comprising a motor; and
an inverter comprising:
  a driver comprising three switching elements included in an upper arm and connected in a three-phase bridge configuration and three switching elements included in a lower arm and connected in a three-phase bridge configuration, and configured to convert input direct current (DC) power into three-phase alternating current (AC) power and to output the three-phase AC power to the motor; and
  at least one processor configured to
    maintain, in a first period, one of the three switching elements, which are included in the upper arm, in an on-state over an entirety of the first period, and one of the three switching elements, which are included in the lower arm, in an off-state over the entirety of the first period, so that a line voltage of "0" is applied to a three-phase load at a crest of a carrier wave in the first period,
    maintain, in a second period, one of the three switching elements, which are included in the lower arm, in an on-state over an entirety of the second period, and one of the three switching elements, which are included in the upper arm, in an off-state over an entirety of the second period, so that a line voltage of "0" is applied to the three-phase load at a crest of a carrier wave in the second period, and
    control the driver in a two-phase modulation method by alternately repeating the first period and the second period.

17. The refrigerator of claim 16, wherein
the at least one processor is configured to turn on all of the three switching elements, which are included in the upper arm, at a crest of a carrier wave in the first period, and the at least one processor is configured to turn off all of the three switching elements, which are included in the upper arm, at a crest of a carrier wave in the second period.

18. The refrigerator of claim 16, wherein
the at least one processor is configured to generate a carrier wave, which is inverted from a carrier wave in the first period, in the second period, and the at least one processor is configured to generate a modulated wave, which is inverted from a modulated wave in the first period, in the second period.

19. The refrigerator of claim 16, wherein
the at least one processor is configured to drive the driver based on a carrier wave in which a frequency varies within a predetermined range.

* * * * *

UNITED STATES PATENT AND TRADEMARK OFFICE
CERTIFICATE OF CORRECTION

| | |
|---|---|
| PATENT NO. | : 12,027,997 B2 |
| APPLICATION NO. | : 17/417543 |
| DATED | : July 2, 2024 |
| INVENTOR(S) | : Hiroyuki Miyake et al. |

It is certified that error appears in the above-identified patent and that said Letters Patent is hereby corrected as shown below:

In the Specification

Column 1, Line 11:
After "Application" insert --No.--.

Column 1, Line 13:
Before "2019-208465" insert --No.--.

In the Claims

Column 11, Line 37:
In Claim 1, delete "motor;" and insert --motor,--.

Column 12, Line 4:
In Claim 3, delete "eon-states/off-states" and insert --on states/off states--.

Column 13, Line 33:
In Claim 16, delete "motor;" and insert --motor,--.

Signed and Sealed this
Twenty-seventh Day of August, 2024

Katherine Kelly Vidal
*Director of the United States Patent and Trademark Office*